United States Patent [19]

Klusener et al.

[11] Patent Number: 5,354,340
[45] Date of Patent: Oct. 11, 1994

[54] PREPARATION OF COPOLYMERS

[75] Inventors: Peter A. A. Klusener; Petrus W. N. M. Van Leeuwen; Hans A. Stil, all of Amsterdam, Netherlands

[73] Assignee: Shell Oil Company, Houston, Tex.

[21] Appl. No.: 150,934

[22] Filed: Nov. 10, 1993

[30] Foreign Application Priority Data

Nov. 20, 1992 [EP] European Pat. Off. ........ 92203588.6

[51] Int. Cl.5 .............................................. C08G 67/02
[52] U.S. Cl. .................................... 528/392; 528/271
[58] Field of Search ................................ 528/271, 392

[56] References Cited

U.S. PATENT DOCUMENTS 5,071,926 12/1991 Drent .................................. 525/539
5,216,120 6/1993 Drent et al. .......................... 528/392

FOREIGN PATENT DOCUMENTS 181014 5/1986 European Pat. Off. .
248483 12/1987 European Pat. Off. .

Primary Examiner—John Kight, III
Assistant Examiner—Shelley A. Dodson
Attorney, Agent, or Firm—James O. Okorafor

[57] ABSTRACT

A process for the preparation of copolymers of carbon monoxide and one or more ethylenically unsaturated compounds by contacting the monomers, under polymerization conditions, with a catalyst system comprising a) a source of cations of one or more metals of Group VIII of the Periodic Table and b) a bidentate ligand, and c) a minor amount of a compound containing a hydride moiety. Copolymers made by this process generally have low molecular weights.

13 Claims, No Drawings

PREPARATION OF COPOLYMERS

BACKGROUND OF THE INVENTION

The invention relates to a process for the preparation of copolymers of carbon monoxide with one or more compounds containing an ethylenically unsaturated bond.

Linear copolymers in which units originating from carbon monoxide substantially alternate with units originating from ethylenically unsaturated compounds, have been extensively described in the patent literature. Convenient methods for the preparation of these copolymers are disclosed in, inter alia, EP 181014 and EP 248483.

In these and similar preparation methods the monomers, i.e. carbon monoxide and one or more ethylenically unsaturated compounds, are contacted with a suitable catalyst, usually a catalyst system based on a metal of Group VIII of the Periodic Table.

The copolymers obtained typically have an average molecular weight, calculated as number average ($\overline{Mn}$), of more than 10,000, and have established utility as thermoplastics. They may be processed by means of conventional techniques into films, sheets, plates, fibers, shaped articles such as containers for foods and drinks, and parts for the car industry.

For obtaining copolymers with optimal properties for the intended use, it is advantageous to minimize variations in the average molecular weight of the copolymers produced. Therefore, it would be desirable to perform the copolymerization process under such conditions that the average molecular weight of the product can be controlled and substantially remains at the desired value.

For other uses of thermoplastic polymers other than those previously mentioned, it is preferred to utilize polymers having considerably lower average molecular weights, e.g. of 2500 or lower. These polymers, such as oligomers and low molecular weight copolymers, may be used as such, or may be applied as starting materials for the preparation of other valuable products, e.g. as intermediates for the production of plastics, as blending components or as plasticizers for other polymers. It would therefore also be of advantage if the polymerization process could be carried out under such conditions that copolymers with lower molecular weight are predominantly formed.

It has already been proposed to subject the copolymers with an average molecular weight of more than 10,000 to a fractionation treatment and to separate the low molecular fraction therefrom. This method has the disadvantage of being time-consuming and moreover, the yield of the desired low molecular fraction is generally very low. It has further been proposed to increase the temperature at which the copolymerization is carried out. Although the formation of products with lower molecular weight is thus enhanced, the stability of the catalyst system often becomes a problem.

The molecular weight of the copolymers produced can also be reduced by addition of molecular hydrogen during the reaction. It appears that with most catalyst systems a significant reduction in molecular weight only occurs by applying large amounts of hydrogen, say of 60 mol % or more, based on carbon monoxide. Apart from the unattractiveness of a high-hydrogen consumption, the use of large quantities of hydrogen moreover often results in a reduction of the metal of Group VIII, accompanied by inactivation of the catalyst system. Only in exceptional cases, by selection of specific ligands in the catalyst system, the desired reduction in molecular weight of the copolymers can be achieved, without impairing the activity of the catalyst system.

Surprisingly, it has now been found that an adequate control of the average molecular weight of the formed copolymers can be achieved and that products having a relatively low molecular weight can be prepared, when the copolymerization reaction is carried out in the presence of a minor amount of a compound containing a hydride moiety.

SUMMARY OF THE INVENTION

The invention may be defined as relating to a process for the preparation of copolymers of carbon monoxide and one or more ethylenically unsaturated compounds by contacting the monomers, under polymerization conditions, with a catalyst system comprising a) a source of cations of one or more metals of Group VIII of the Periodic Table and b) a bidentate ligand, in the additional presence of a minor amount of a compound containing a hydride moiety.

Suitable compounds containing a hydride moiety include compounds comprising one or more hydrogen atoms, typically linked to a central metal or non-metal atom. Usually compounds are applied in which a single hydride group is present, but compounds comprising more than one hydride moiety per molecule are likewise suitable.

The hydride nature of the hydrogen atoms in the compounds applied may be promoted by the prevailing reaction conditions and depends, inter alia, on the polarizability of the selected compounds.

Examples of suitable compounds containing a hydride moiety are hydrides of metals such as tin, germanium and lead and of non-metals such as silicon. It is considered that in view of the polarizability of the hydrogen-hydrogen bond in molecular hydrogen, application of this compound in principle is feasible as well.

Preferred compounds are silanes, such as $SiH_4$, aryl silanes such as diphenylsilane and triphenylsilane, alkylsilanes, such as trimethylsilane, triethylsilane, tripropylsilane, 1,1,1-trimethyldisilane, 1,1,2-trimethyldisilane, tris(trimethylsilyl)silane and alkylarylsilanes such as dimethylphenylsilane and diphenylethylsilane. Most preferred are triarylsilanes, in particular triphenylsilane. Further examples of suitable compounds containing a hydride moiety are stannanes such as $SnH_4$, tributylstannane and triphenylstannane and germananes.

According to the invention a minor amount of a compound containing a hydride moiety is provided. Although not wishing to be bound by any theory, it is believed that the said compound acts as a chain transfer agent and that, accordingly, the amounts applied are advantageously those generally applicable for other chain transfer agents. The presence of relatively large amounts of compounds containing a hydride moiety can be disadvantageous, as this may result in the reduction of the Group VIII metal and, consequently, in the inactivation of the catalyst. The preferred amount in which the compound containing a hydrogen moiety is applied, depends to a large extent on the desired molecular weight of the copolymer produced.

For controlling the molecular weight of the copolymers and minimizing any occurring variations of the molecular weight, small amounts of the compound containing a hydride moiety usually suffice, whereas for preparing copolymers with a substantially reduced molecular weight applying otherwise the same reaction conditions, a somewhat higher amount may be required.

In practice, the amount is preferably in the range of from $10^1$ to $10^7$ mol per gram atom of Group VIII metal of the catalyst system.

Most preferably, the amount is selected in the range of from $10^2$ to $10^5$ on the same basis.

The compound containing a hydride moiety may be supplied separately to the reactor. Conveniently, it is supplied together with one or more of the other reactor components. If desired, part of the compound containing a hydride moiety may be initially supplied to the reactor, while the remaining part is added continuously, or in increments during the reaction.

The catalyst system used in the process of the invention comprises a source of cations of one or more metals of Group VIII, i.e. the group consisting of ruthenium, rhodium, palladium, osmium, iridium, and platinum and the iron group metals, iron, cobalt, and nickel. Preferably the Group VIII metal is selected from the group consisting of palladium, cobalt, and nickel. In particular, good results are obtained with catalyst systems comprising a source of palladium cations. As a source for Group VIII metal, cations, preferably salts are used. Suitable salts include mineral salts such as sulfates, nitrates, and phosphates. Other suitable salts are salts of sulfonic acids such as methylsulfonic acid, trifluoromethanesulfonic acid and p-toluenesulfonic acid.

Preferably a salt of a carboxylic acid is used, such as acetic acid, propionic acid, trifluoroacetic acid, oxalic acid, and citric acid.

In particular, preferred sources of cations of Group VIII metals are the acetates of these metals.

As a source for Group VIII metal, cations used may also be made of the metals in their elemental form, or in a zero-valent state thereof, e.g. in complex form, for example tetrakis-(triphenylphosphine)palladium (0). These sources are generally applied in combination with a protic acid, thus yielding the metal cations in situ.

The catalyst system of the invention additionally comprises a bidentate ligand, i.e. a compound containing two sites which can form a complexing bond with the metal(s) of Group VIII. The two complexing sites are believed to contribute significantly to the formation of stable catalyst systems.

Preferred bidentate ligands can be indicated by the general formula $$R^1R^2\text{-}M^1\text{-}R\text{-}M^2\text{-}R^3R^4 \qquad (I)$$

wherein $M^1$ and $M^2$ independently represent phosphorus, arsenic, antimony or nitrogen atoms, $R^1$, $R^2$, $R^3$, and $R^4$ independently represent substituted or non-substituted hydrocarbyl groups and R represents a bivalent bridging group containing at least two atoms in the bridge.

In the ligands of formula (I) $M^1$ and $M^2$ preferably represent phosphorus atoms. $R^1$, $R^2$, $R^3$, and $R^4$ may independently represent optionally substituted aryl, alkyl, alkaryl, aralkyl, or cycloalkyl groups. Preferably at least one of $R^1$, $R^2$, $R^3$, and $R^4$ represents an aryl group, in particular an aryl group, substituted by one or more polar groups. Suitable polar groups include halogen atoms, such as fluorine or chlorine atoms, alkoxy groups such as methoxy- or ethoxy groups and (di)alkylamino groups such as methylamino-, dimethylamino-, ethylamino- and diethylamino groups.

If one or more of $R^1$, $R^2$, $R^3$, and $R^4$ represents an aryl group, preference is given to a phenyl group.

Preferably a substituted phenyl group is present, whereby one or both ortho positions with respect to $M^1$ and/or $M^2$ are substituted with an alkoxy group, preferably a methoxy group.

In the ligands of formula (I) R preferably represents a bivalent bridging group containing two to four bridging atoms, at least two of which are carbon atoms. Examples of suitable R groups are:

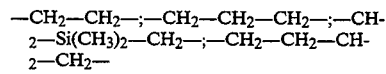

and

In addition to a source of cations for one or more metals of Group VIII and a bidentate ligand, the catalyst systems of the invention preferably comprise a source of anions. As suitable sources of anions, acids or salts thereof may be mentioned, in particular acids having a pKa of 4 or less, preferably of less than 2. Examples of suitable acids are mineral acids such as perchloric acid, sulfonic acids such as para-toluenesulfonic acid and methanesulfonic acid and halogen-carboxylic acids such as trifluoroacetic acid.

If desired, the source of anions can be combined with the source of cations of Group VIII metals and be provided as a single compound, such as a palladium-fluoroacetate, or nickel perchlorate.

The amount of catalyst used in the process of the invention may vary considerably. Generally, the amount is in the range of from $10^{-7}$ to $10^{-1}$ gram atom of Group VIII metal(s) per mole of ethylenically unsaturated compound to be copolymerized. Preferably the amount is in the range of $10^{-6}$ to $10^{-2}$ on the same basis.

Ethylenically unsaturated compounds, suitable to be used as starting material, include unsaturated compounds consisting exclusively of carbon and hydrogen and compounds comprising in addition, one or more heteroatoms, such as oxygen or nitrogen atoms. Examples are unsaturated esters, such as methylacrylate and vinylacetate. Unsaturated hydrocarbons are, however, preferred. Suitable examples are the lower olefins, such as ethene, propene and 1-butene, cyclic olefins such as cyclopentene and aryl-substituted olefins such as styrene. Ethene and mixtures of ethene and propene are in particular preferred starting materials.

The molar ratio between the monomer reactants, i.e. carbon monoxide and the ethylenically unsaturated compound(s) is advantageously selected in the range of 5:1 to 1:5, preferably in the range of 1.5:1 to 1:1.5, substantially equimolar amounts being most preferred.

The copolymerization reaction is preferably carried out in the presence of a liquid diluent. Apolar as well as polar diluents such as pentane or acetone are suitable. Preference is given to organic protic diluents, in particular to alcohols such as propanol-1 and methanol.

The reaction is generally performed at temperatures in the range of from 20°–150° C. and at pressures in the range of from 2–150 bar. Preferred reaction temperatures are in the range of from 30°–130° C. and preferred pressures are selected in the range of from 5 to 100 bar.

The invention will be illustrated by the following, non-limiting examples.

EXAMPLE 1

A copolymer of carbon monoxide and ethene was prepared as follows:

As reactor, a 250 mL mechanically stirred autoclave was used which was charged with 133 mL of methanol. In order to remove air from the reactor, the autoclave was pressurized with an equimolar ethene/carbon monoxide mixture to 40 bar, whereupon the pressure was released. This procedure was repeated twice. Subsequently, the temperature was raised to 85° C. and an equimolar mixture of ethene and carbon monoxide was introduced until the pressure was 55 bar. Finally, a catalyst solution consisting of 0.020 mmol of palladium (II) acetate (1.8 mg Pd), 0.022 mmol of 1,3-bis(diphenylphosphino)propane (7.4 mg) and 0.045 mmol of p-toluenesulfonic acid (6.8 mg) in 7 mL of acetone was added to the reactor.

After a reaction period of 1.5 hours, the polymerization was terminated by cooling the reaction mixture to ambient temperature and by releasing the pressure. Solid product was filtered off and dried.

10.53 g polymer was obtained, the average polymerization rate being 4.0 kg product per g palladium and per hour. The limiting viscosity number (LVN), measured in m-cresol at 60° C., was 0.88 dL/g, corresponding to an average molecular weight ($\overline{M}n$) of 11,000.

EXAMPLE 2

A copolymer of carbon monoxide and ethene was prepared, substantially as described in Example 1, with the following differences:

i) a 160 mL autoclave reactor was used;
ii) the autoclave was charged with 78 mL of methanol, containing 2.2 g triphenylsilane;
iii) the reaction temperature was 87° C.; 19.20 g polymer was obtained, the average polymerization rate being 4.1 kg product per g palladium and per hour. The LVN, measured in m-cresol at 60° C. was 0.34 dL/g, corresponding with an average molecular weight ($\overline{M}n$) of 4000.

EXAMPLE 3

A copolymer of carbon monoxide and ethene was prepared, substantially as described in Example 1 with the following differences:

i) the reaction temperature was 95° C.;
ii) the reactor was charged with 171 ml of methanol;
iii) the catalyst solution comprised 2.0 mg of Pd, 8.2 mg of 1,3-bis(diphenylphosphino)propane and 8.2 mg of p-toluene-sulfonic acid in 4 mL of acetone.
iv) the reaction period was 1.22 hours.

25.84 g polymer was obtained, the average polymerization rate being 10.8 kg of product per g palladium and per hour. The average molecular weight, determined by end-group analysis with the aid of $_{13}$C NMR spectrometry, was 5900. The analysis showed that ethyl and ester end-groups had been formed.

EXAMPLE 4

A copolymer of carbon monoxide and ethene was prepared, substantially as described in Example 3 with the following differences:

i) the autoclave was charged with 88 mL of methanol, containing 0.29 g of triethylsilane;
ii) the catalyst solution comprised 2.0 mg of Pd, 8.1 mg of 1,3-bis(diphenylphosphino)propane and 8.6 mg of p-toluene-sulfonic acid in 4 mL of acetone.
iii) the reaction period was 1.55 hours.

25.2 g polymer was obtained, the average polymerization rate being 8.3 kg product per g palladium and per hour. The average molecular weight, determined by end-group analysis $^{13}$C NMR was 5000. The analysis showed that ethyl, ester, and acetal end-groups had been formed.

EXAMPLE 5

A copolymer of carbon monoxide and ethene was prepared, substantially as described in Example 4 with the following differences:

i) the autoclave was charged with 84 ml of methanol, containing 2.9 g of triethylsilane;
ii) the reaction period was 1.93 hours. 3.42 g polymer was obtained, the average polymerization rate being 0.9 kg product per g palladium and per hour.

The average molecular weight, determined by end-group analysis $_{13}$C NMR was 1900. The analysis showed the presence of ethyl, ester, and acetal end-groups.

EXAMPLE 6

A copolymer of carbon monoxide and ethene was prepared, substantially as described in Example 3, with the following differences:

i) the catalyst solution contained 8.4 mg of p-toluene sulfonic acid instead of 8.2 mg;
ii) the autoclave was charged with 171 mL of methanol containing 4.2 g of triphenylsilane;
iii) the reaction period was 1.91 hour.

24.65 g polymer was obtained, the average polymerization rate being 13.6 kg of product per g palladium and per hour. The average molecular weight, determined by end-group analysis $^{13}$C NMR was 1800. The analysis showed that ethyl, ester, and acetal end-groups had been formed.

Of the above Examples, Examples 2, 4, 5, and 6 are according to the invention. Examples 1 and 3 have been included for comparison only.

As can be seen from the experiments described in Examples 1 and 2, addition of a compound containing a hydride moiety significantly reduces the molecular weight of the copolymer produced.

From the experiments described in Examples 3, 4, 5, and 6 it is evident that adding a larger amount of the hydride containing compound results in a further decrease in molecular weight of the copolymer obtained.

While this invention has been described in detail for the purpose of illustration, it is not to be construed as limited thereby but is intended to cover all changes and modifications within the spirit and scope thereof.

What is claimed is:

1. A process for the preparation of copolymers of carbon monoxide and one or more ethylenically unsaturated compounds by contacting the monomers, under polymerization conditions, with a catalyst system comprising a) a source of cations of one or more metals of Group VIII of the Periodic Table and b) a bidentate ligand, and c) a minor amount of a compound containing at least one metal hydride wherein said metal is selected from the group consisting of tin, germanium, and lead.

2. A process for the preparation of copolymers of carbon monoxide and one or more ethylenically unsaturated compounds by contacting the monomers, under polymerization conditions, with a catalyst system comprising a) a source of cations of one or more metals of Group VIII of the Periodic Table and b) a bidentate ligand, and c) a minor amount of a compound containing at least one non-metal hydride, wherein said non-metal is silicon.

3. A process as in claim 2 wherein said non-metal hydride compound is a silane compound.

4. A process as in claim 3 wherein said silane is selected from the group consisting of arylsilanes, alkylsilanes, and alkylarylsilane.

5. A process as in claim 4 wherein said arylsilane is triphenylsilane.

6. A process as in claim 4 wherein said arylsilane is diphenylsilane.

7. A process as in claim 3 wherein said alkylsilane is selected from the group consisting of trimethylsilane, triethylsilane, tripropylsilane, 1,1,1-trimethyldisilane, 1,1,2trimethyldisilane, and tris-(trimethylsilyl)silane.

8. A process as in claim 3 wherein said alkylarylsilane is dimethylphenylsilane.

9. A process as in claim 3 wherein said alkylarylsilane is diphenylethylsilane.

10. A process as in claim 1 wherein said hydride moiety-containing compound is present in an amount of from $10^{-1}$ to $10^{-7}$ mol per gram atom of Group VIII metal of the catalyst system.

11. A process as in claim 5 wherein said triphenylsilane is present in an amount of from about $10^2$ to $10^5$ mol per gram atom of Group VIII metal of the catalyst system.

12. A low molecular weight copolymer of carbon monoxide and one or more ethylenically unsaturated compounds prepared by the process of claim 1.

13. An article of manufacture made from the copolymer of claim 12.

* * * * *